United States Patent
Luo et al.

(10) Patent No.: US 10,022,812 B2
(45) Date of Patent: Jul. 17, 2018

(54) METHODS FOR THE ELECTROEROSION MACHINING OF HIGH-PERFORMANCE METAL ALLOYS

(71) Applicant: GENERAL ELECTRIC COMPANY, Schenectady, NY (US)

(72) Inventors: Yuanfeng Luo, Rexford, NY (US); Steven Robert Hayashi, Niskayuna, NY (US); Andrew Lee Trimmer, Niskayuna, NY (US); Mark James Cintula, Middle Grove, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 361 days.

(21) Appl. No.: 14/510,757

(22) Filed: Oct. 9, 2014

(65) Prior Publication Data
US 2016/0101479 A1    Apr. 14, 2016

(51) Int. Cl.
*B23H 3/10*    (2006.01)
*B23H 5/02*    (2006.01)
(Continued)

(52) U.S. Cl.
CPC .................. *B23H 3/10* (2013.01); *B23H 1/10* (2013.01); *B23H 3/00* (2013.01); *B23H 5/02* (2013.01);
(Continued)

(58) Field of Classification Search
CPC ... B23H 9/10; B23H 9/14; B23H 3/10; B23H 5/02; B23H 5/14; B23H 2400/00; B23H 2400/10
See application file for complete search history.

(56) References Cited

U.S. PATENT DOCUMENTS 3,372,099 A    3/1968 Clifford
3,409,522 A    11/1968 Grenier et al.
(Continued)

FOREIGN PATENT DOCUMENTS

CN    103480926 A    1/2014
GB    2041813 A    9/1980

OTHER PUBLICATIONS

Bhattacharyya et al.,"Experimental investigation on the influence of electrochemical machining parameters on machining rate and accuracy in micromachining domain", International Journal of Machine Tools and Manufacture, ScienceDirect, Oct. 2003, vol. 43, Issue 13, pp. 1301-1310.

(Continued)

*Primary Examiner* — Nicholas A Smith
(74) *Attorney, Agent, or Firm* — GE Global Patent Operation; Pabitra Chakrabarti

(57) ABSTRACT

A method of machining a work-piece formed of titanium-based material, using a machining apparatus, is described. The method includes the steps of providing an electrically-conductive electrode contained within a spindle assembly, in a pre-selected distance and position relative to the titanium-based work-piece; while electrically powering the electrode and the work-piece with a power supply. In the process, fluid electrolyte is circulated through at least two pathways in the machining apparatus—an internal conduit within the spindle assembly; and an external conduit. The charged electrode is moved relative to the work-piece in a plunging motion, to remove material from the work-piece at a relatively high rate, using a high-speed electro-erosion (HSEE) process.

20 Claims, 5 Drawing Sheets

(51) Int. Cl.
- *B23H 5/14* (2006.01)
- *B23H 7/36* (2006.01)
- *B23H 9/10* (2006.01)
- *B23H 9/14* (2006.01)
- *B23H 3/00* (2006.01)
- *B23H 1/10* (2006.01)
- *B23H 1/04* (2006.01)
- *B23H 3/04* (2006.01)

(52) U.S. Cl.
CPC ............... *B23H 5/14* (2013.01); *B23H 7/36* (2013.01); *B23H 9/10* (2013.01); *B23H 9/14* (2013.01); *B23H 1/04* (2013.01); *B23H 3/04* (2013.01); *B23H 2400/10* (2013.01)

(56) References Cited

U.S. PATENT DOCUMENTS

| | | | |
|---|---|---|---|
| 3,436,331 A | 4/1969 | Dietz et al. | |
| 3,453,288 A | 7/1969 | McConnell | |
| 4,430,180 A * | 2/1984 | Shimizu | B23H 1/10 204/224 M |
| 5,171,408 A | 12/1992 | Thornton | |
| 6,835,299 B1 | 12/2004 | Tchugunov | |
| 7,394,040 B2 | 7/2008 | Wei et al. | |
| 7,572,997 B2 | 8/2009 | Kao et al. | |
| 7,741,576 B2 | 6/2010 | Trimmer et al. | |
| 7,824,526 B2 | 11/2010 | Yuan et al. | |
| 7,976,694 B2 | 7/2011 | Trimmer et al. | |
| 8,323,473 B2 | 12/2012 | Luo et al. | |
| 8,470,160 B2 | 6/2013 | Luo et al. | |
| 2007/0256939 A1* | 11/2007 | Wei | B23H 1/022 205/674 |
| 2008/0277384 A1* | 11/2008 | Trimmer | B23H 1/04 219/69.17 |
| 2010/0320078 A1 | 12/2010 | Yuan et al. | |
| 2011/0073464 A1 | 3/2011 | Luo et al. | |
| 2011/0303553 A1 | 12/2011 | Inman et al. | |
| 2012/0285820 A1 | 11/2012 | Li et al. | |
| 2013/0048612 A1 | 2/2013 | Luo et al. | |

OTHER PUBLICATIONS

Mohan Sen et al., "A review of electrochemical macro- to micro-hole drilling processes", International Journal of Machine Tools and Manufacture, ScienceDirect, Feb. 2005, vol. 45, Issue 2, pp. 137-152.

Mamoru Kubota, "On the Technological Potentialities of ECDM", Mecanique, No. 303, pp. 15-18, XP001345488, Mar. 1, 1975 (Mar. 1, 1975).

European Search Report issued in connection with corresponding EP Application No. 15187844.4 dated Apr. 5, 2016.

* cited by examiner

METHODS FOR THE ELECTROEROSION MACHINING OF HIGH-PERFORMANCE METAL ALLOYS

BACKGROUND

This disclosure is generally directed to the machining of metallic components. In some specific embodiments, the disclosure is related to the electromachining of components formed from advanced structural metals and alloys.

Advanced metallic materials play an increasingly important role in modern manufacturing industries like aircraft, automobile, and tool- and die-making industries. The materials usually exhibit greatly-improved thermal, chemical, and mechanical properties, as compared to conventional materials. Specific properties that are enhanced include strength, heat resistance, wear resistance, and corrosion resistance. Even modest improvements can result in considerable economic benefits to manufacturing industries through improved product performance and product design.

While the advanced materials exhibit many desirable attributes, they are sometimes very difficult to process. As an example, traditional machining and casting processes for specialized materials such as titanium alloys are often inadequate, and require the removal of large amounts of stock, when forming plates, bars, and the like. Moreover, the operations often need to be supplemented by additional processes, such as multiple finishing operations. Also, the chemical and physical properties of titanium and its alloys can make drilling operations challenging, often resulting in an undesirably large heated affected zone (HAZ). For these reasons, the overall processing cost can be much higher, as compared to materials like steel.

A number of techniques have been developed to process advanced materials like titanium and nickel superalloys. Electrical discharge machining (or EDM) is a machining method primarily used for hard metals, or those that would be impossible to machine with traditional techniques. The technique is carried out with rapidly-recurring electrical arcing discharges between an electrode (the cutting tool) and the work-piece, in the presence of an energetic electric field. The EDM cutting tool is guided along the desired path very close to the work-piece, but it does not touch the work-piece. This technique is sometimes referred to as "electroerosion". Other electromachining techniques are also known in the art, including electrochemical machining (ECM), electrochemical grinding (ECG); and electrochemical discharge machining (ECDM), all described in U.S. Pat. No. 7,741,576 (A. Trimmer et al).

While current electromachining processes are acceptable in many situations, additional design and performance requirements for various high-performance alloys have prompted the search for considerable advances in the processes. As an example, certain components formed from titanium and its alloys can still be very difficult to machine, due to lower thermal conductivity, and the inability keep the machining region free from process debris. As described below, the machining debris can imperil the electroerosion process, and can result in damage to both the machining equipment and the work-piece. Moreover, there is still a need to improve the material removal rate (MRR) for machining high-performance alloys in an industrial setting, since excessive machining times and the need for many other processing steps can decrease the economic viability of the overall process. Thus, improved electroerosion processes that address some of these challenges would be welcome in the art.

SUMMARY OF THE INVENTION

One embodiment of the invention is directed to a method of machining a work-piece formed of titanium-based material, using a machining apparatus. The method comprises the steps of:

(a) providing an electrically-conductive electrode contained within a spindle assembly, in a pre-selected distance and position relative to the titanium-based work-piece; while electrically powering the electrode and the work-piece with a power supply;

(b) circulating fluid electrolyte through at least two pathways in the machining apparatus; wherein one pathway comprises an internal conduit within the spindle assembly; and a second pathway comprises an external conduit outside of the spindle assembly and at least partially within a gap between the electrode and the work-piece; and (c) moving the electrode relative to the work-piece in a plunging motion, to remove material from the work-piece at a relatively high rate, using a high-speed electro-erosion (HSEE) process.

Another embodiment is directed to a method of machining a titanium-based component, in which material is removed from selected regions of the component by using a high-speed electroerosion (HSEE) process, in which an electrically-conductive electrode is controllably moved and rotated in a plunging, pocket-hole forming motion, relative to the component; and wherein a fluid electrolyte is circulated through both an internal pathway within the electrode and an external pathway outside of the electrode and within a gap between the electrode and the component. In this embodiment, a total pressure value of the circulating electrolyte fluid and the rotational speed of the electrode are simultaneously controlled by an automated mechanism, so as to maximize the efficiency of titanium removal from the component.

DRAWINGS

DETAILED DESCRIPTION

In regard to this disclosure, any ranges disclosed herein are inclusive and combinable (e.g., compositional ranges of "up to about 25 wt %", or more specifically, "about 5 wt % to about 20 wt %", are inclusive of the endpoints and all intermediate values of the ranges). Moreover, the terms "first," "second," and the like, herein do not denote any order, quantity, or importance, but rather are used to distinguish one element from another. The terms "a" and "an" herein do not denote a limitation of quantity, but rather denote the presence of at least one of the referenced items.

Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

Titanium and its alloys find use in a number of important applications, often related to the aerospace, nuclear, and electronic industries. However, as alluded to previously, conventional techniques are often ineffective for machining titanium, as well as other hard metals. The use of the specialized type of electro discharge machining known as high-speed electro-erosion (HSEE) machining, according to embodiments described herein, can result in the efficient machining of a titanium-based work-piece. As used herein, "titanium-based" refers to alloys that contain at least about 50% by weight titanium, and in some embodiments, at least about 75% by weight titanium. In some key embodiments, the work-piece benefiting by this type of machining technique is a component of a turbine engine or a portion of an aircraft airframe.

Figure 1:
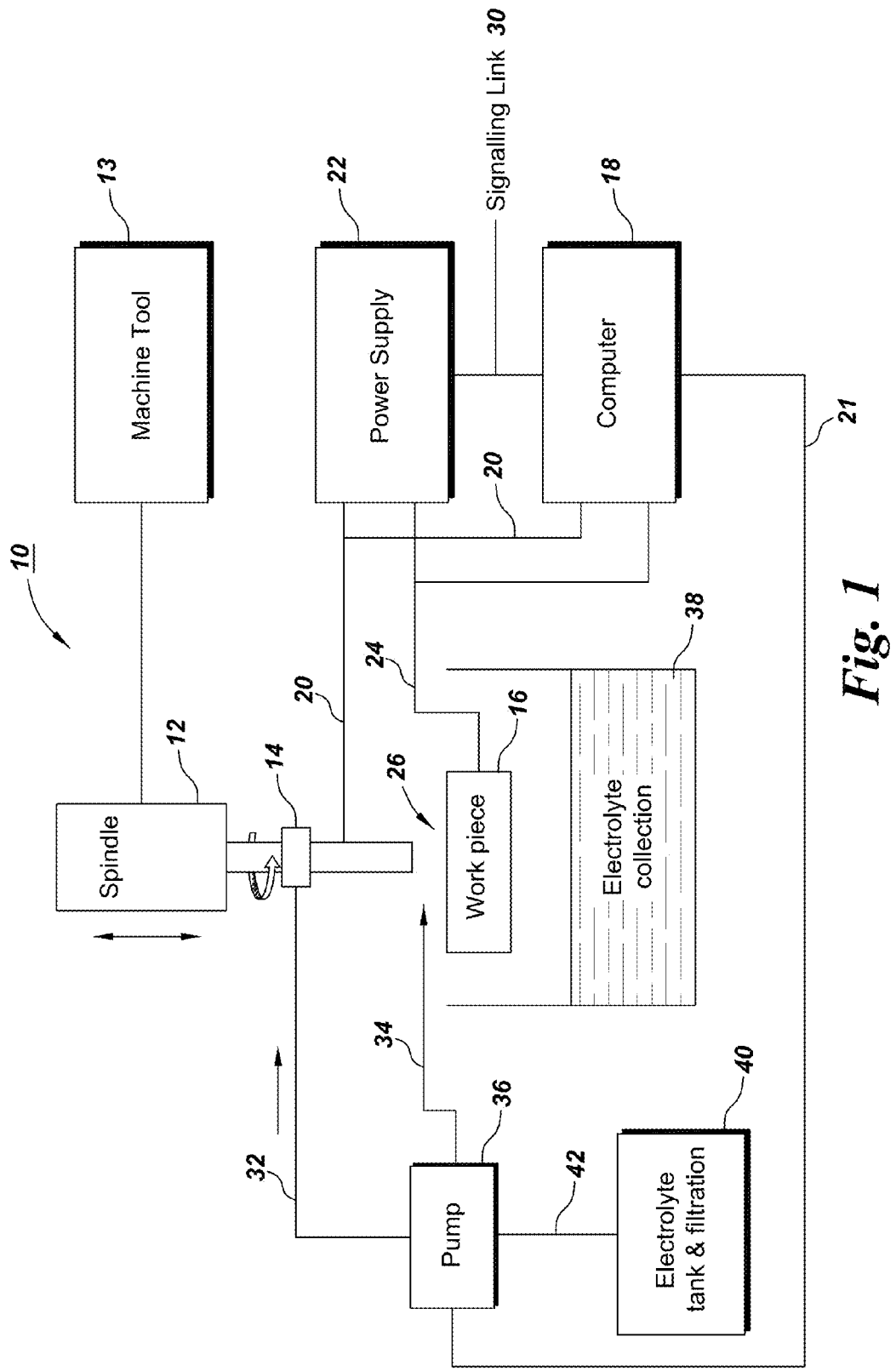
FIG. 1 is a schematic illustration of an apparatus for carrying out a machining process according to some embodiments of this invention.

FIG. 1 is an illustrative machining apparatus 10 for carrying out the process according to some embodiments of this invention. Spindle assembly 12, the action-component of machine tool 13, includes a spinning tool electrode 14, which is more fully described in FIG. 2. The spindle normally holds the electrode in place, as further described below; and the spinning tool can enhance fluctuation in flushing, which can be a desirable phenomenon. Usually, the spindle assembly is contained in or otherwise connected to a multi-axis machine configured to support and rotate the electrode.

The work-piece 16 is typically supported on a work-piece carrier (not shown). The carrier holds and moves the work-piece relative to the milling tool by rotating and translating the work-piece carrier, by way of computer control (e.g., a servo-control 18), described as a "computer" or "controller" for simplicity. Computer 18, which sometimes includes an EEM numerical control program, executes stored programs to send control signals to the servos and electronics that operate the machine tool. The computer may also include a plug-in circuit board, as an interface for a signaling link between the power supply 22 (mentioned below) and the computer. Various signal and control/power circuits 20 communicate operating conditions to the computer 18, and may also communicate related control signals from the computer, such as automatic system shut-off in case of overheating, low fluid, and the like. It can thus be seen that machine tool 13, often having the multi-axis movement capabilities, is in operative communication with computer/controller 18, by way of a configuration that allows for the distribution of intermittent multiple electrical arcs between the electrode 14 and the work-piece 16. Those skilled in the art understand that the configuration of the control circuits can be varied considerably, based on the specific design of the machining apparatus.

As mentioned above, spindle assembly 12 is usually mounted on or attached to machine tool 13. (Rather than being detached as shown in FIG. 1, assembly 12 and tool 13 can be in the form of a unitary body). Moreover, power supply 22 (often a DC supply, which can optionally be in the pulsed mode) is provided to energize the tool electrode 14, for electroerosion in the gap between the electrode and the work-piece 16. (Some related details are provided in U.S. Pat. No. 7,824,526, Yuan et al, the contents of which are incorporated herein by reference).

A first electrical potential can be conducted via power circuit 20 to the tool electrode 14. A second electrical potential can be conducted via power circuit 24 to the work-piece 16, forming an electrical circuit that includes the media within the gap 26. This generates discharges (e.g., an electrical arc) in the gap 26 between the work-piece 16 and the tool electrode 14. The computer 18 usually controls servos in the machine 10, to perform relative movement between the electrode and the work-piece, thus controlling the gap. Thus, computer 18 monitors and controls the electromachining process of the spindle assembly 12, the associated power supply 22; and an electrolyte pump, mentioned below.

Power supply 22 often includes a voltage measuring means, e.g., a voltage measuring circuit. The circuit can sense voltages across gap 26, via the power circuit 20, 24, and can communicate this data, via signaling link 30, to a circuit board-processor within computer 18. In this manner, information regarding the discharging status and condition of gap 26 can be obtained and utilized (with the aid of the control program mentioned above), which can in turn be used to control the machining feed rate and power profile, for optimal machine operation.

The power system can include various other features and devices as well, most of which are well-known in the art. Non-limiting examples include additional microprocessors or other computational devices; a timing device; a pulse generation device; a voltage comparison device; a data storage device, and the like. Without undue effort, those skilled in the art will be able to select the most appropriate features for a given embodiment within the scope of this invention.

The machining apparatus of this invention includes a fluid electrolyte system. Such a system is used to minimize the heat buildup that can occur during the electrical erosion (electroerosion) process, while also washing away eroded particles and other debris from the work-piece being machined. Removal of these particles from the gap 26 and surrounding region can be very important in allowing the electroerosion process to operate efficiently. A liquid electrolyte circulation system is often used to serve both the cooling and flushing functions that are required, as described, for example, in the Yuan et al patent mentioned above. The electrolyte system is also important for providing electrical conductivity to drive specific electrothermal events for this type of machining process, e.g., providing more control over the timing of electrical discharge events like a voltage breakdown. The fluid electrolyte often includes one or more conventional additives for increasing electrical discharge between the work-piece and the electrode.

In preferred embodiments mentioned previously, the fluid electrolyte is circulated through two pathways in the machining apparatus. They are shown in simplified form in FIG. 1, wherein one pathway includes an internal conduit 32, which proceeds through tool 14, toward gap 26. The pathway can alternatively be directed through spindle 12 and tool 14. The other pathway includes an external conduit 34, which directs the electrolyte fluid directly to the region around gap 26. Pump 36 can be used to direct the flow of both fluids, although other pumping arrangements could alternatively be employed, e.g., multiple pumps.

The use of internal flushing, in addition to external flushing, can be very advantageous for embodiments of this invention. Internal flushing can often provide a more direct (and faster) cooling effect in the gap region, thereby enhancing the general cooling action provided by the external flushing system. Moreover, when the machining electrode is being used with the plunging motion described below, internal flushing can ensure a smoother, cleaner work-piece surface as the electrode retracts to permit debris removal. (The plunging motion is usually axial and generally perpendicular to the work-piece surface). The periodic voids necessary to enable internal flushing, the flushing ports, break the electrical arc and cause a relaxation of the thermal process, allowing any built-up machining debris to be effectively evacuated. In some embodiments, the use of multiple axis holes, e.g., three off-axis holes, is preferred, in part because it can avoid or minimize the occurrence of a pillar caused by the use of a single axial flushing hole.

The system set forth in FIG. 1 may include various other features, some of which are described in the referenced patent to Yuan et al. For example, the work-piece and tool assembly may be surrounded by a protective shield (not shown). Moreover, electrolyte collection tank 38 can be positioned to catch all of the used electrolyte fluid, which can then be directed to storage tank 40 by conventional means. The storage tank may include or be attached to a filtration unit for removing debris from the electrolyte fluid, and ensuring that the fluid can be ready for re-use, e.g., being directed back to pump 36 via conduit 42. Pump 36 can also communicate with computer 18 via data conduit 21, mentioned above, allowing for data communication to the computer, and for control communication from the computer. In this manner, electrolyte flow control and machining can be shut down, if necessary, as conditions like overheating or low fluid flow are monitored.

Figure 2:
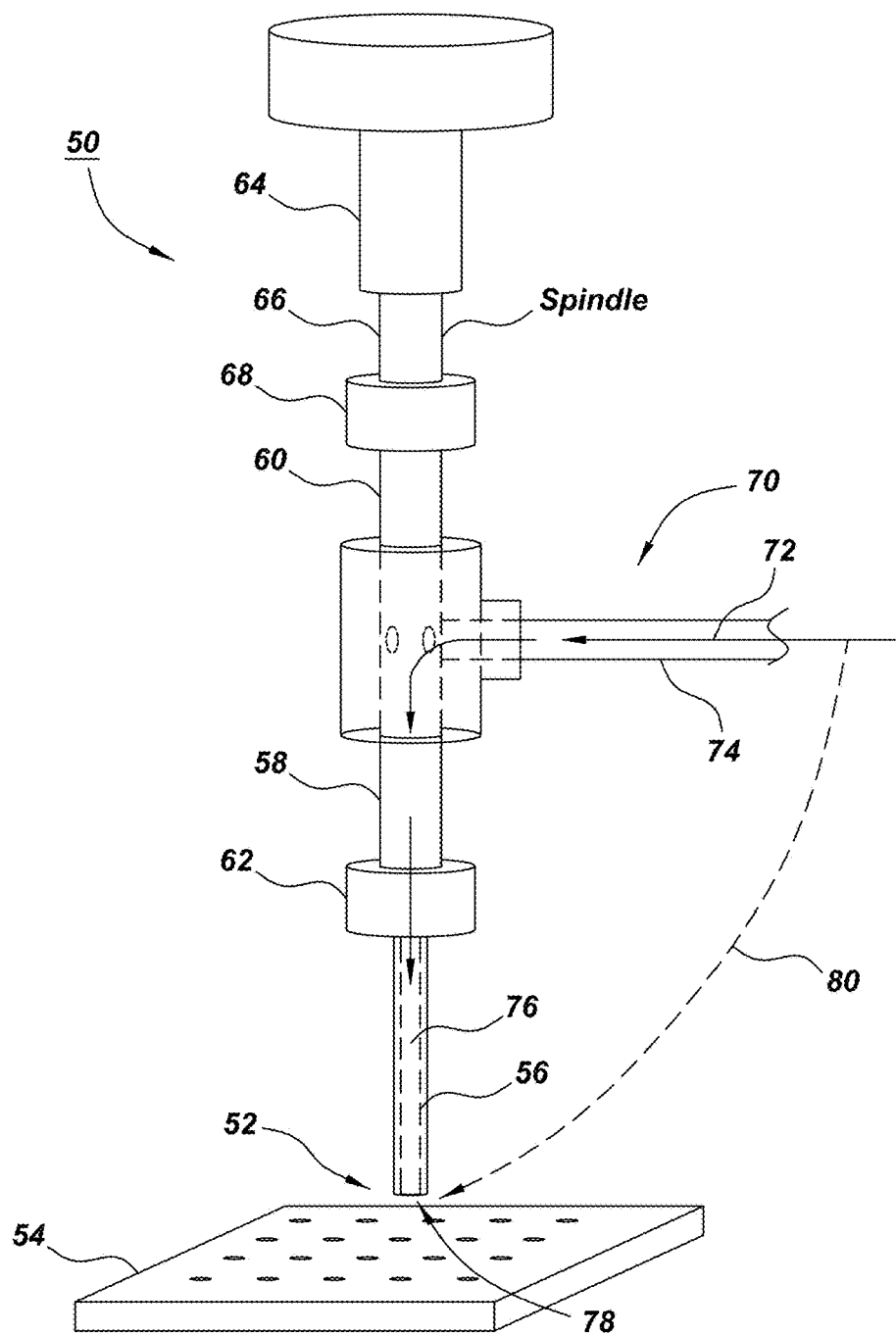
FIG. 2 illustrates a spindle assembly employed for embodiments of this invention.

FIG. 2 is an illustration of a spindle/tool assembly 50, similar to the assembly 12/14 generally depicted in FIG. 1. Assembly 50 is positioned across a gap 52 from a work-piece 54. A power supply (not shown in this figure) generates electrical discharges in the gap 52 that machine the work-piece. The tool 56 may be mounted on the forward end 58 of a rotatable adapter shaft 60, by means of collet 62. A tool holder 64 is usually fixed to the upper end of adapter shaft 60, retaining spindle 66, aligned through collet 68. However, those skilled in the art will be familiar with other suitable means to retain the spindle in proper position.

According to the principles of this type of machining process (e.g., an HSEE process), the electrode 56 is rotated during the series of current discharges, so as to cause the desired electroerosion of the work-piece. In preferred embodiments for the present invention, the electrode is rotated during the HSEE process at a linear speed of at least about 36,000 inches per minute; and usually, in the range of about 7,000 inches per minute to about 125,000 inches per minute. Very often, the electrode is operated under a current density of at least about 15 amps/mm$^2$. Other details regarding suitable HSEE techniques can be found in U.S. Pat. Nos. 7,976,694 and 7,741,576 (Trimmer et al), both incorporated herein by reference.

The power scheme for operating assembly 50 is generally conventional; and the details need not be provided in FIG. 2. (An illustrative technique is provided in the referenced patent of Yuan et al). Typically, the power supply energizes the tool electrode 56, by applying pulses of a voltage difference $\Delta V$ between a lead attached to the tool electrode and a lead attached to the work-piece. Power can be transmitted between the lead associated with the tool electrode and the spinning adapter shaft 60, by means of a stationary-to-rotor conduction device (not shown). Examples of such a device would include an assembly of electrical brush contacts; or the use of a rotary transformer.

FIG. 2 also shows an internal flushing system 70 in simple form, according to embodiments of this invention. As described above, a flow of liquid electrolyte 72 is supplied from a pump (not shown) through a suitable entry conduit 74. The electrolyte fluid is then directed through an axial channel within adapter shaft 60, while the shaft is spinning. As described in the Yuan et al patent, but not specifically shown here, a fluid manifold that is sealed around a portion of the shaft 60 may be used to contain and direct the electrolyte fluid. In some instances, passage of the fluid in this manner is referred to as "through-the-spindle" flushing.

The electrolyte fluid is then directed into the tool conduit 76, and exits through one or more openings (not specifically shown) to the gap 52. (The openings would be present in the lower end 78 of the electrode 56). The fluid provides the cooling and debris-removal functions, by way of a flushing action. As described above, internal flushing can provide considerable advantages for embodiments of the present invention. (Other details were also provided with reference to FIG. 1, e.g., the use of a collection tank to capture the used electrolyte for treatment and recirculation). Moreover, preferred embodiments for the machining system also include an external flushing system, for directing fluid to the gap region. For the purpose of brevity, that system is simply depicted here by way of dashed lines 80.

Figure 3:
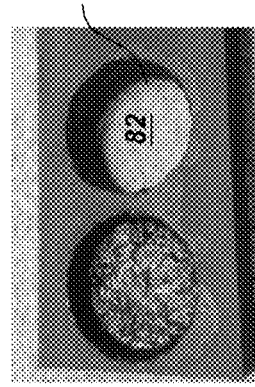
FIG. 3 is an illustration of various machining steps according to some inventive embodiments.
Figure 3:
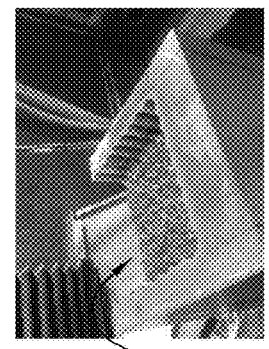
Figure 3:
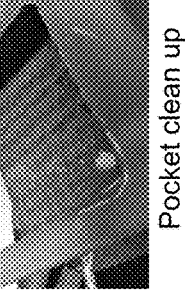

The machining system of this invention is very effective for "plunging" through a selected thickness of the work-piece, and can form one or more relatively large holes. For example, a pattern of holes can be formed by advancing the negatively-charged electrode toward the positively-charged work-piece, to erode the work-piece in a manner sufficient to form a series of pocket holes 82, as depicted in FIG. 3. Formation of the holes can advantageously take place, using aggressive machining parameters, while maintaining a relatively high material removal rate, without substantially increasing the size of the heat-affected zone (HAZ) of the component.

The upper-left portion of FIG. 3 depicts test coupons in which pockets 82 have been formed by a machining system similar to that of FIG. 1, with pocket 82 extending through to the underlying substrate; and the adjacent, illustrated pocket extending only partially through the coupon. The collective pattern of pocket plunges shown in the middle section of the figure is CNC-controlled, as described above, and can precisely form a desired open region 84 that is relatively large, in hard-to-machine alloys like Ti6Al4V. The lower right portion of FIG. 3 shows open region 84, after being cleaned and smoothened by post-machining techniques. A clean pass over the region (profile milling) utilized relatively "gentle" parameters to remove any waviness from the plunge cuts, while also removing the thick re-cast layer and the HAZ caused by plunging.

In preferred embodiments of this invention, electroerosion can be controlled by a unique control technique that is especially suited for the machining system described above. Aspects of this technique are described in U.S. Pat. No. 8,323,473 (Luo et al), incorporated herein by reference. FIG. 1 can be used for an illustration, in which power supply 22 is configured to generate electric discharges that machine the work-piece 16. As alluded to above, the power supply energizes the tool electrode 14 by applying the $\Delta V$ pulses, so as to generate the discharges, in gap 26, that selectively erode the work-piece.

The multiple, applied pulses having a pulse width $\Delta \tau$ (tau) result in an applied voltage waveform having multiple pulse-on and pulse-off states. In response to the applied voltage waveform, the discharges in the gap 26 generate a voltage waveform that represents the voltage in the gap; and the voltage waveform comprises multiple discharge pulses. (It should be understood that the applied waveform, having applied pulses, and the voltage waveform, having discharge pulses, are distinct from each other). A servo-controller associated with computer 18 (i.e., they may be integrated, or may be separate units) can be used to control mechanical movements in the overall machining apparatus, including controlling the size of the gap 26, and the relative movement of the electrode 14 and the work-piece 16, so as to maintain a desired alignment for particular machining conditions.

Thus, it should be understood that the computer/controller 18 is coupled to the power supply 22, the electrode 14, and the work-piece 16. The computer is generally configured to perform a number of functions. Some of them include: directing the power supply to apply pulses of potential difference $\Delta V$ between the electrode and the work-piece; measuring the voltage across the gap 26; generating selected time intervals; initiating the measurement after the passage of an interval of time (or a time delay); averaging voltage values; comparing voltage values; measuring electrical current; and generating control signals to regulate specific functions, like the power supply.

Those skilled in the art understand that the computer/controller 18 may include a microprocessor or another type of computational device, a voltage and current measurement device, a timing device, a pulse generation device, a voltage comparison device, a current comparison device; a data storage device, and various other devices. These devices are generally known in the art; and a suitable version may be used without deviating from the scope of the invention.

Figure 4:
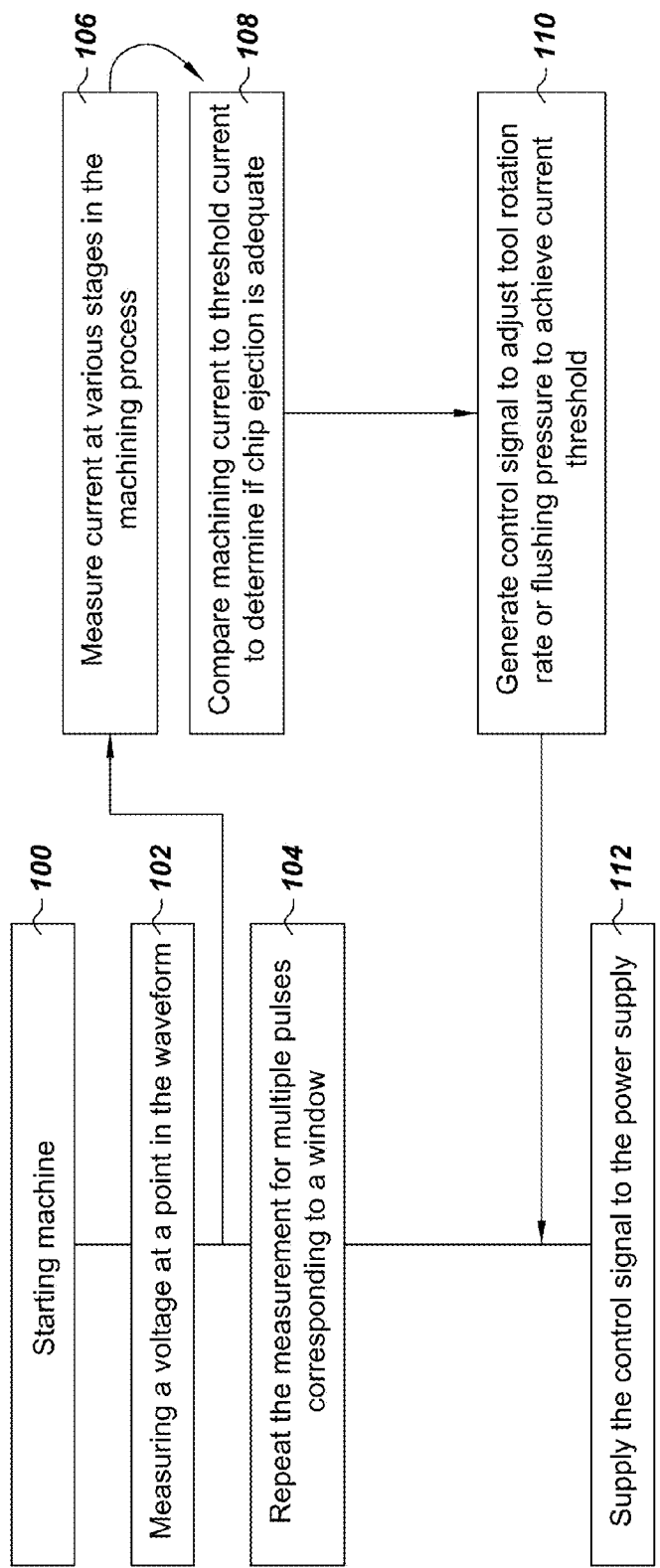
FIG. 4 is an illustration of selected control- and monitoring steps for a machining process according to some embodiments of the invention.

FIG. 4 is an illustration of a method for monitoring and controlling the machining steps for removing titanium from the work-piece, according to embodiments of this invention, using an exemplary system like that of FIG. 1. Machining is initiated on a work-piece in step 100, and an initial voltage is then measured (step 102) at a point after a specified time delay $t_d$. In some embodiments, the time delay corresponds to half of the applied pulsed width $\Delta \tau$, as measured from a pulse-on state of an applied pulse of the applied voltage waveform. The time delay $t_d$ can be varied, relative to the applied pulse width, e.g., ⅔ of the applied pulse width. The measurement of voltage in this manner is repeated in step 104 for multiple pulses of the voltage waveform, with each measurement being completed after a specific time delay for the pulse-on state of the applied pulses for the applied waveform.

Since this type of machining operation is usually carried out by way of direct current (DC), a threshold current is also measured, relative to the applied voltage waveform, as the machining process begins and evolves to steady state. During machining, periodic current measurements are then taken in step 106, usually at pre-selected intervals. The current flow is related in part to the effect of machining on the work-piece, e.g., in the gap region 26 (FIG. 1), relative to work-piece 16. As mentioned above, debris or "chips" from the work-piece can accumulate in the gap, even when the flushing operation is underway. If there is not enough force to eject these chips from the gap region, their presence can lead to the formation of a molten metal bridge that in turn can cause an electrical short in the system, shutting down the machining operation.

For various embodiments, the measured current during the machining operation is then compared, relative to the threshold current, according to step 108. As explained above, the measurement and comparison can be handled automatically by the computer/controller. Excessive or sudden increases in current indicate that debris may be accumulating as described above, adversely affecting the electrical discharge from the tool electrode. As a non-limiting example, at a set potential of about 20 volts, the average current during a machining operation on a titanium component might be about 500 Amps, i.e., during normal operation. A sudden increase in current over a pre-selected current limit, e.g., to 700-900 Amps, indicates that the machining operation is out-of-specification, most likely due to the accumulation of debris.

According to embodiments of this invention, the increase in current above an acceptable threshold generates a control signal in step 110, via the associated computer/controller, e.g., station 18 in the system of FIG. 1. The control signal regulates at least one of two operating parameters for the machining system. The first parameter is the tool rotation rate, e.g., the rotation speed of tool electrode 56, depicted in FIG. 2. As alluded to previously, rotation is controlled by spindle 66 and rotatable shaft 60, all powered by a power supply like that shown in FIG. 1. In one embodiment, the control signal instructs the power supply to increase the rotational speed of the tool, e.g., step 112 in FIG. 4. The increased rotation speed can in turn clear electro-eroded chips and other debris away from gap area 52, and/or eject any mound or bridge of molten metal blocking the gap. In this manner, the process can be returned to "in-control" status, e.g., as shown by a return to normal electrical current parameters.

The second parameter that can be regulated is the flushing pressure. Thus, in the event of "out-of-control" status, the control signal can instruct the power supply to increase the pumping activity which controls flushing. For example, in the case of the machining system of FIG. 1, the power supply 22, controlled by computer 18, can increase the flow of electrolyte through one or both of the internal (32) and external (34) electrolyte conduits. (The choice of which flushing system to adjust can be determined through experimentation on a particular type of system, without undue effort). An increase in flushing pressure can clear debris and eject any molten metal mass formed in the gap area, as in the case of the adjustment in tool rotation speed, until the system is returned to in-control status.

The techniques described above for embodiments of this invention can be very advantageous for restoring the machining process to a normal condition. They can also decrease the amount of energy that is required at the machining site, thereby minimizing the damage to the electrode and the work-piece. In some embodiments, the control system can instruct the power supply to turn off when the machining process is out of control. In general, any of these strategies, or combination of strategies, may be employed, depending on the desired characteristics of the machining system, by configuring the control signal appropriately. For instance, in one embodiment of the invention, a flushing pressure value of circulating electrolyte fluid and the rotational speed of the electrode are simultaneously controlled by an automated mechanism, so as to maximize the efficiency of titanium removal from the work-piece.

Figure 5:
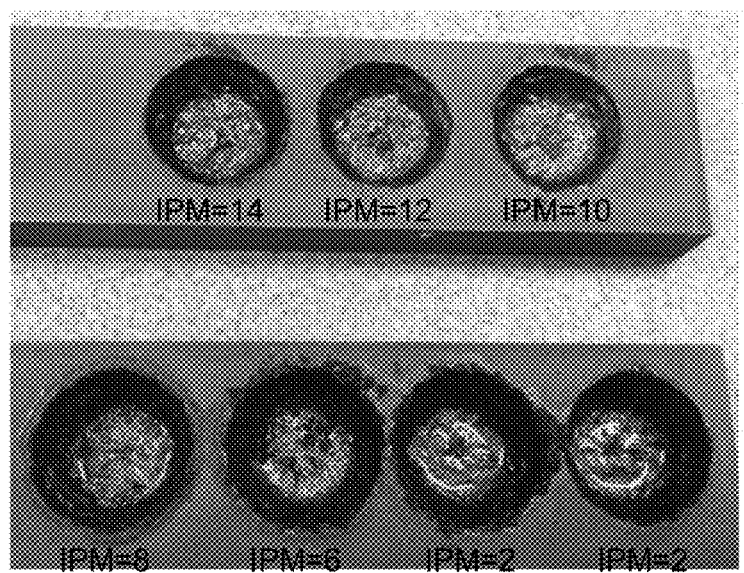
FIG. 5 is a photograph of holes resulting from pocket-plunging, according to some embodiments of the invention.
Figure 6:
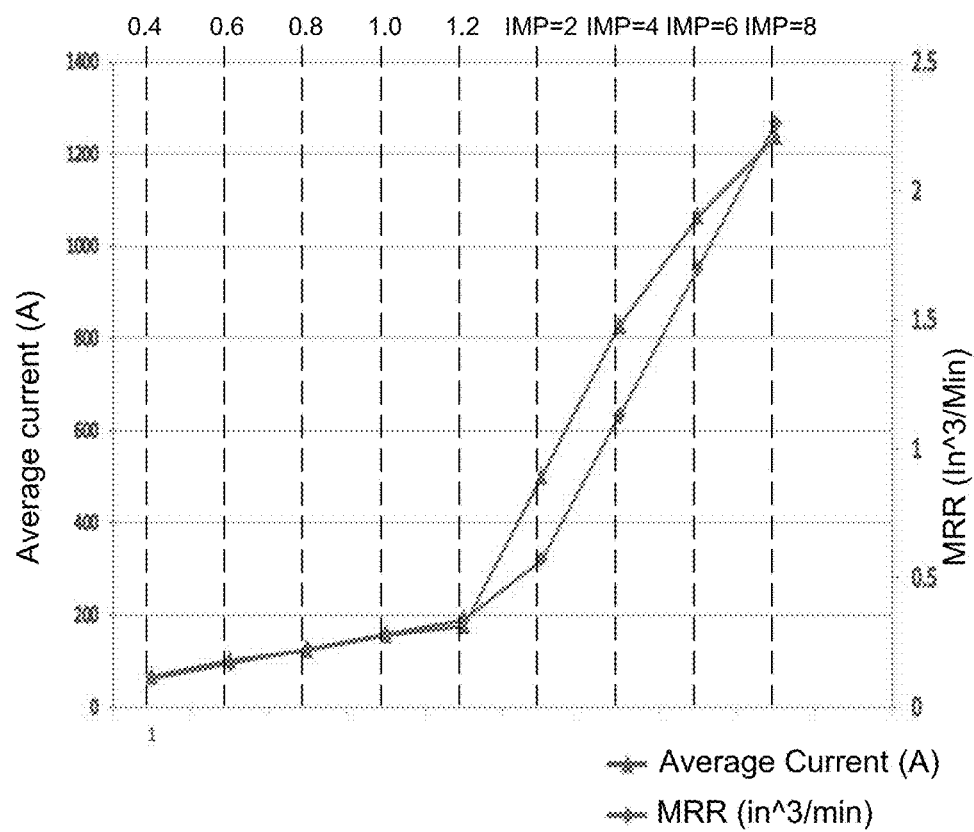
FIG. 6 is a graph depicting material removal rate characteristics, for machining processes according to some inventive embodiments.

FIG. 5 is a photograph of holes formed on test coupons, according to the pocket-plunging technique (a "Z" direction plunge) described above, based on the use of a spindle/tool assembly like that shown in FIG. 2. The size of each hole or "pocket" depends in part on the tool feed speed, in terms of inches-per-minute (IPM) units. FIG. 6 is a graph, based on electroerosion results from a system similar to that of FIG.

1, with a work-piece formed of Ti-6Al-4V (titanium-aluminum-vanadium). The graph shows material removal rate (MRR), as a function of system current, in amperes. An increase in the average electrical current has a positive effect on the MRR value.

Moreover, it will be apparent to those of ordinary skill in this area of technology that other modifications of this invention (beyond those specifically described herein) may be made, without departing from the spirit of the invention. Accordingly, the modifications contemplated by those skilled in the art should be considered to be within the scope of this invention. Furthermore, all of the patents, patent articles, and other references mentioned above are incorporated herein by reference.

What is claimed:

1. A method of machining a work-piece formed of titanium-based material, using a machining apparatus, the method comprising:
   (a) providing an electrode contained within a spindle assembly, in a pre-selected distance and position relative to the work-piece, while electrically powering the electrode and the work-piece with a power supply, wherein the electrode is electrically-conductive;
   (b) circulating a fluid electrolyte through at least two pathways in the machining apparatus, wherein a first pathway comprises an internal conduit within the spindle assembly, and wherein a second pathway comprises an external conduit outside of the spindle assembly and at least partially within a gap between the electrode and the work-piece; and
   (c) moving the electrode relative to the work-piece in a plunging motion, and retracting the electrode to permit removal of the titanium-based material from the work-piece using a high-speed electroerosion (HSEE) process,
   wherein a total flushing pressure value of the circulating fluid electrolyte and a rotational speed of the electrode are simultaneously controlled by an automated mechanism when a measured current in the electrode exceeds a threshold current of the electrode, so as to maximize an efficiency of removal of the titanium-based material from the work-piece by reducing formation of a molten metal bridge from debris of the removed titanium-based material in the gap.

2. The method of claim 1, wherein the electrode is rotated during the HSEE process at a linear speed in a range from about 7,000 inches per minute to about 125,000 inches per minute.

3. The method of claim 2, wherein the linear speed is at least about 36,000 inches per minute.

4. The method of claim 2, wherein the electrode is operated under a current density of at least about 15 amps/mm$^2$.

5. The method of claim 1, wherein the fluid electrolyte provides cooling to the work-piece and to the gap between the work-piece and the electrode, and wherein the fluid electrolyte further flushes away the debris that results from the removal of the titanium-based material from the work-piece.

6. The method of claim 5, wherein the fluid electrolyte comprises one or more additives for increasing an electrical discharge between the work-piece and the electrode.

7. The method of claim 1, wherein the spindle assembly is contained in a multi-axis machine or connected to the multi-axis machine, and wherein the multi-axis machine is configured to support and rotate the electrode.

8. The method of claim 7, wherein the multi-axis machine is in operative communication with a controller configured to distribute intermittent multiple electrical arcs between the electrode and the work-piece.

9. The method of claim 1, wherein the plunging motion is axial and perpendicular to a work-piece surface that requires removal of material.

10. The method of claim 9, wherein the plunging motion cuts pocket holes into the work-piece surface.

11. The method of claim 1, wherein the work-piece is a component of a turbine engine or a portion of an aircraft airframe.

12. The method of claim 1, wherein the electrode is energized by the power supply that applies a potential difference $\Delta V$ between the work-piece and the electrode with the threshold current, the method further comprising:
   (i) measuring the current at selected intervals during machining;
   (ii) comparing the measured current with the threshold current to determine if the measured current indicates an out-of-control status; and
   (iii) generating a control signal indicative of the out-of-control status, the control signal resulting in an adjustment of (I) an electrode rotation speed or (II) an electrolyte flushing pressure, so as to return the machining to an in-control status.

13. A method of machining a titanium-based component, in which material is removed from selected regions of the titanium-based component by using a high-speed electroerosion (HSEE) process in which an electrically-conductive electrode is controllably moved, retracted to permit removal of the material and rotated in a plunging, pocket-hole forming motion, relative to the titanium-based component; and
   wherein a fluid electrolyte is circulated through both an internal pathway within the electrically-conductive electrode and an external pathway outside of the electrically-conductive electrode and within a gap between the electrically-conductive electrode and the titanium-based component, and
   wherein a total flushing pressure value of the circulating fluid electrolyte and a rotational speed of the electrically-conductive electrode are simultaneously controlled by an automated mechanism when a measured current in the electrically-conductive electrode exceeds a threshold current of the electrically-conductive electrode, so as to maximize an efficiency of removal of the material from the titanium-based component by reducing formation of a molten metal bridge from debris of the removed material in the gap.

14. The method of claim 13, wherein the electrically-conductive electrode is rotated during the HSEE process at a linear speed in a range from about 7,000 inches per minute to about 125,000 inches per minute.

15. The method of claim 14, wherein the linear speed is at least about 36,000 inches per minute.

16. The method of claim 14, wherein the electrically-conductive electrode is operated under a current density of at least about 15 amps/mm$^2$.

17. The method of claim 13, wherein the fluid electrolyte provides cooling to the titanium-based component and to the gap between the titanium-based component and the electrically-conductive electrode, and wherein the fluid electrolyte further flushes away the debris that results from the removal of the material from the titanium-based component.

18. The method of claim 17, wherein the fluid electrolyte comprises one or more additives for increasing an electrical discharge between the titanium-based component and the electrically-conductive electrode.

19. The method of claim 13, wherein the plunging is axial and perpendicular to a surface of the titanium-based component that requires removal of material.

20. The method of claim 13, wherein the electrically-conductive electrode is energized by a power supply that applies a potential difference ΔV between the titanium-based component and the electrically-conductive electrode with the threshold current, the method further comprising:
   (i) measuring the current at selected intervals during machining;
   (ii) comparing the measured current with the threshold current to determine if the measured current indicates an out-of-control status; and
   (iii) generating a control signal indicative of the out-of-control status, the control signal resulting in an adjustment of (I) an electrically-conductive electrode rotation speed or (II) an electrolyte flushing pressure, so as to return the machining to an in-control status.

* * * * *